(12) United States Patent
Hiroe et al.

(10) Patent No.: US 7,255,662 B2
(45) Date of Patent: Aug. 14, 2007

(54) POWER OUTPUT APPARATUS AND HYBRID VEHICLE

(75) Inventors: Yoshihiko Hiroe, Toyota (JP); Yoshiaki Kikuchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 279 days.

(21) Appl. No.: 11/140,973

(22) Filed: Jun. 1, 2005

(65) Prior Publication Data
US 2005/0272556 A1    Dec. 8, 2005

(30) Foreign Application Priority Data
Jun. 2, 2004    (JP)    ............... 2004-164908

(51) Int. Cl.
B60K 1/02    (2006.01)
F16H 59/64    (2006.01)
B60W 10/04    (2006.01)

(52) U.S. Cl. ............... 477/3; 477/98; 477/110; 903/941

(58) Field of Classification Search ............... 477/3, 477/98, 107, 108, 110; 180/65.2, 65.3, 65.4; 903/941
See application file for complete search history.

(56) References Cited

U.S. PATENT DOCUMENTS

| | | | |
|---|---|---|---|
| 5,218,939 A | 6/1993 | Stumpp | |
| 6,109,237 A * | 8/2000 | Pels et al. | 903/941 |
| 6,422,972 B1 * | 7/2002 | Eguchi | 477/107 |
| 6,664,651 B1 * | 12/2003 | Kotre et al. | 180/65.4 |
| 6,727,676 B2 | 4/2004 | Ochiai | |
| 6,732,526 B2 * | 5/2004 | Minagawa et al. | 477/98 |
| 7,023,150 B2 * | 4/2006 | Hisada et al. | 180/65.2 |
| 2002/0163199 A1 | 11/2002 | Ramaswamy et al. | |
| 2005/0045134 A1 * | 3/2005 | Amanuma et al. | 123/179.4 |

FOREIGN PATENT DOCUMENTS

| | | |
|---|---|---|
| JP | 07-279702 | 10/1995 |
| JP | 2003-206777 | 7/2003 |

\* cited by examiner

Primary Examiner—Roger Pang
(74) Attorney, Agent, or Firm—Kenyon & Kenyon LLP

(57) ABSTRACT

An idle rotation speed Nidl of an engine is set to increase with an increase in actual vehicle speed V and with an increase in measured temperature Tb of a battery (step S160). The drive control of the invention controls the engine and two motors to idle the engine at the preset idle rotation speed Nidl and to ensure output of a required power corresponding to a torque demand Tr* to a drive shaft within a range between an input limit Win and an output limit Wout of the battery (steps S190 to S230). Such control enables the engine to have a high following capability and promptly change its output power level in response to a change in power demand P*, which is accompanied by an abrupt variation in torque demand Tr*. The technique of the invention thus desirably reduces the required level of charging or discharging of the battery, which is triggered by a response delay of the engine.

16 Claims, 10 Drawing Sheets

POWER OUTPUT APPARATUS AND HYBRID VEHICLE

BACKGROUND OF THE INVENTION

1. Field of the Invention

The present invention relates to a power output apparatus, a hybrid vehicle, and control methods of the power output apparatus and the hybrid vehicle.

2. Description of the Prior Art

One proposed power output apparatus changes the idle rotation speed of an engine as an output source of driving force according to the residual charge level or current state of charge and the temperature of a battery (see, for example, Japanese Patent Laid-Open Gazette No. 2003-206777). This prior art power output apparatus increases the idle rotation speed of the engine, when the residual charge level of the battery decreases to or below a preset reference value corresponding to the battery temperature. The increase of the idle rotation speed of the engine protects the battery from over discharge and accordingly prevents accelerated deterioration of the battery.

SUMMARY OF THE INVENTION

This prior art technique, however, does not take into account premature deterioration of the battery due to repeated charges and discharges within an allowable charge-discharge range, while certainly preventing deterioration due to over discharge of the battery.

A power output apparatus, a hybrid vehicle, and control methods of the power output apparatus and the hybrid vehicle of the invention thus aim to prevent premature deterioration of an accumulator unit, such as a secondary battery.

In order to attain at least part of the above and the other related objects, the configurations discussed below are applied to the power output apparatus, the hybrid vehicle, and the control methods of the power output apparatus and the hybrid vehicle of the invention.

The present invention is directed to a power output apparatus that outputs power to a drive shaft and includes: an internal combustion engine; a power conversion mechanism that converts at least part of output power of the internal combustion engine into electric power; a motor that consumes the electric power converted by the power conversion mechanism to output power to the drive shaft; an accumulator unit that transmits electric power to and from the power conversion mechanism and the motor; a rotation speed measurement unit that measures a rotation speed of the drive shaft; and a control unit including :a target idle rotation speed setting module that sets a target idle rotation speed of the internal combustion engine corresponding to the measured rotation speed of the drive shaft; a power demand specification module that specifies a power demand required for the drive shaft; a target power setting module that sets a target power to be output from the internal combustion engine corresponding to the specified power demand; and a control module that, when the target power requires idling of the internal combustion engine, controls the internal combustion engine, the power conversion mechanism, and the motor to idle the internal combustion engine at the target idle rotation speed and to ensure output of a required power corresponding to the specified power demand to the drive shaft, and when the target power does not require idling of the internal combustion engine, on the other hand, controls the internal combustion engine, the power conversion mechanism, and the motor to ensure output of the target power from the internal combustion engine and to ensure output of a required power corresponding to the specified power demand to the drive shaft.

When the target power requires idling of the internal combustion engine, the power output apparatus of the invention sets the target idle rotation speed of the internal combustion engine corresponding to the measured rotation speed of the drive shaft and controls the internal combustion engine, the power conversion mechanism, and the motor to idle the internal combustion engine at the target idle rotation speed and to ensure output of the required power corresponding to the specified power demand to the drive shaft. When the target power does not require idling of the internal combustion engine, on the other hand, the power output apparatus controls the internal combustion engine, the power conversion mechanism, and the motor to ensure output of the target power from the internal combustion engine and to ensure output of a required power corresponding to the specified power demand to the drive shaft. Idling of the internal combustion engine at the target idle rotation speed, which is set corresponding to the observed rotation speed of the drive shaft, enables the internal combustion engine to have a high following capability and promptly change its output power level in response to an abrupt change of the power demand required for the drive shaft. This arrangement desirably reduces the required level of charging or discharging of the accumulator unit, which is triggered by a response delay of the internal combustion engine, and thus effectively prevents premature deterioration of the accumulator unit due to the repeated charges and discharges. The power output apparatus of the invention also ensures output of the required power corresponding to the specified power demand to the drive shaft.

In one preferable embodiment of the power output apparatus of the invention, the target idle rotation speed setting module sets the target idle rotation speed to increase with an increase in measured rotation speed of the drive shaft. Such setting is on the ground that the higher rotation speed of the drive shaft leads to the greater power difference in response to an abrupt change of the power demand required for the drive shaft and that the higher target idle rotation speed leads to the quicker increase of the output power level from the internal combustion engine.

The present invention is directed to a hybrid vehicle including: an internal combustion engine; a power conversion mechanism that converts at least part of output power of the internal combustion engine into electric power; a motor that consumes the electric power converted by the power conversion mechanism to output power to a drive shaft linked to an axle; an accumulator unit that transmits electric power to and from the power conversion mechanism and the motor; a vehicle speed measurement unit that measures a vehicle speed; and a control unit including: a target idle rotation speed setting module that sets a target idle rotation speed of the internal combustion engine corresponding to the measured vehicle speed; a power demand specification module that specifies a power demand required for the drive shaft; a target power setting module that sets a target power to be output from the internal combustion engine corresponding to the specified power demand; and a control module that, when the target power requires idling of the internal combustion engine, controls the internal combustion engine, the power conversion mechanism, and the motor to idle the internal combustion engine at the target idle rotation speed and to ensure output of a required power corresponding to the specified power demand to the drive shaft, and when the target power does not require idling of the internal combustion engine, on the other hand, controls the internal combustion engine, the power conversion mechanism, and the motor to ensure output of the target power from the internal combustion engine and to ensure output of a required power corresponding to the specified power demand to the drive shaft.

When the target power requires idling of the internal combustion engine, the hybrid vehicle of the invention sets the target idle rotation speed of the internal combustion engine corresponding to the measured vehicle speed and controls the internal combustion engine, the power conversion mechanism, and the motor to idle the internal combustion engine at the target idle rotation speed and to ensure output of the required power corresponding to the specified power demand to the drive shaft linked to an axle. When the target power does not require idling of the internal combustion engine, on the other hand, the hybrid vehicle controls the internal combustion engine, the power conversion mechanism, and the motor to ensure output of the target power from the internal combustion engine and to ensure output of a required power corresponding to the specified power demand to the drive shaft. Idling of the internal combustion engine at the target idle rotation speed, which is set corresponding to the observed vehicle speed, enables the internal combustion engine to have a high following capability and promptly change its output power level in response to an abrupt change of the power demand required for the drive shaft. This arrangement desirably reduces the required level of charging or discharging of the accumulator unit, which is triggered by a response delay of the internal combustion engine, and thus effectively prevents premature deterioration of the accumulator unit due to the repeated charges and discharges. The hybrid vehicle of the invention also ensures output of the required power corresponding to the specified power demand to the drive shaft.

In one preferable embodiment of the hybrid vehicle of the invention, the target idle rotation speed setting module sets the target idle rotation speed to increase with an increase in measured vehicle speed. Such setting is on the ground that the higher vehicle speed leads to the greater power difference in response to an abrupt change of the power demand required for the drive shaft and that the higher target idle rotation speed leads to the quicker increase of the output power level from the internal combustion engine.

In another preferable embodiment of the invention, the power output apparatus or the hybrid vehicle further includes a temperature measurement unit that measures temperature of the accumulator unit. The target idle rotation speed setting module sets the target idle rotation speed corresponding to the measured temperature of the accumulator unit. This arrangement sets the target idle rotation speed of the internal combustion engine according to the observed temperature of the accumulator unit, thus effectively preventing premature deterioration of the accumulator unit. The target idle rotation speed setting module may set the target idle rotation speed to increase with an increase in measured temperature of the accumulator unit. Such setting is ascribed to the fact that the higher temperature generally accelerates deterioration of the accumulator unit.

In the power output apparatus or the hybrid vehicle of the invention, the power conversion mechanism may be connected to an output shaft of the internal combustion engine and to the drive shaft and output at least part of the output power of the internal combustion engine to the drive shaft through input and output of electric power and mechanical power. In this case, the power conversion mechanism may include: a three shaft-type power input output module that is linked to three shafts, that is, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft. In another case, the power conversion mechanism may include a pair-rotor motor that has a first rotor linked to the output shaft of the internal combustion engine and a second rotor linked to the drive shaft and is driven by relative rotation of the first rotor to the second rotor.

The present invention is directed to a control method of a power output apparatus, which includes an internal combustion engine, a power conversion mechanism that converts at least part of output power of the internal combustion engine into electric power, a motor that consumes the electric power converted by the power conversion mechanism to output power to a drive shaft, and an accumulator unit that transmits electric power to and from the power conversion mechanism and the motor, and the control method include the steps of: setting a target power to be output from the internal combustion engine corresponding to a specified power demand required for the drive shaft; and when the target power requires idling of the internal combustion engine, setting a target idle rotation speed of the internal combustion engine corresponding to a measured rotation speed of the drive shaft and controlling the internal combustion engine, the power conversion mechanism, and the motor to idle the internal combustion engine at the target idle rotation speed and to ensure output of a required power corresponding to the specified power demand to the drive shaft, and when the target power does not require idling of the internal combustion engine, on the other hand, controlling the internal combustion engine, the power conversion mechanism, and the motor to ensure output of the target power from the internal combustion engine and to ensure output of a required power corresponding to the specified power demand to the drive shaft.

When the target power requires idling of the internal combustion engine, the control method of the power output apparatus of the invention sets the target idle rotation speed of the internal combustion engine corresponding to the measured rotation speed of the drive shaft and controls the internal combustion engine, the power conversion mechanism, and the motor to idle the internal combustion engine at the target idle rotation speed and to ensure output of the required power corresponding to the specified power demand to the drive shaft. When the target power does not require idling of the internal combustion engine, on the other hand, the control method of the power output apparatus controls the internal combustion engine, the power conversion mechanism, and the motor to ensure output of the target power from the internal combustion engine and to ensure output of a required power corresponding to the specified power demand to the drive shaft. Idling of the internal combustion engine at the target idle rotation speed, which is set corresponding to the observed rotation speed of the drive shaft, enables the internal combustion engine to have a high following capability and promptly change its output power level in response to an abrupt change of the power demand required for the drive shaft. This arrangement desirably reduces the required level of charging or discharging of the accumulator unit, which is triggered by a response delay of the internal combustion engine, and thus effectively prevents premature deterioration of the accumulator unit due to the repeated charges and discharges. The control method of the power output apparatus of the invention also ensures output of the required power corresponding to the specified power demand to the drive shaft.

The present invention is directed to a control method of a hybrid vehicle, which includes an internal combustion engine, a power conversion mechanism that converts at least part of output power of the internal combustion engine into electric power, a motor that consumes the electric power converted by the power conversion mechanism to output power to a drive shaft, and an accumulator unit that transmits electric power to and from the power conversion mechanism and the motor, and the control method includes the steps of: setting a target power to be output from the internal combustion engine corresponding to a specified power demand required for an axle; and when the target power requires idling of the internal combustion engine, setting a target idle rotation speed of the internal combustion engine corresponding to a measured vehicle speed and controlling the internal combustion engine, the power conversion mechanism, and the motor to idle the internal combustion engine at the target idle rotation speed and to ensure output of a required power corresponding to the specified power demand to the axle, and when the target power does not require idling of the internal combustion engine, on the other hand, controlling the internal combustion engine, the power conversion mechanism, and the motor to ensure output of the target power from the internal combustion engine and to ensure output of a required power corresponding to the specified power demand to the axle.

When the target power requires idling of the internal combustion engine, the control method of the hybrid vehicle of the invention sets the target idle rotation speed of the internal combustion engine corresponding to the measured vehicle speed and controls the internal combustion engine, the power conversion mechanism, and the motor to idle the internal combustion engine at the target idle rotation speed and to ensure output of the required power corresponding to the specified power demand to the drive shaft linked to an axle. When the target power does not require idling of the internal combustion engine, on the other hand, the control method of the hybrid vehicle controls the internal combustion engine, the power conversion mechanism, and the motor to ensure output of the target power from the internal combustion engine and to ensure output of a required power corresponding to the specified power demand to the drive shaft. Idling of the internal combustion engine at the target idle rotation speed, which is set corresponding to the observed vehicle speed, enables the internal combustion engine to have a high following capability and promptly change its output power level in response to an abrupt change of the power demand required for the drive shaft. This arrangement desirably reduces the required level of charging or discharging of the accumulator unit, which is triggered by a response delay of the internal combustion engine, and thus effectively prevents premature deterioration of the accumulator unit due to the repeated charges and discharges. The control method of the hybrid vehicle of the invention also ensures output of the required power corresponding to the specified power demand to the drive shaft.

DESCRIPTION OF THE PREFERRED EMBODIMENTS

Figure 1:
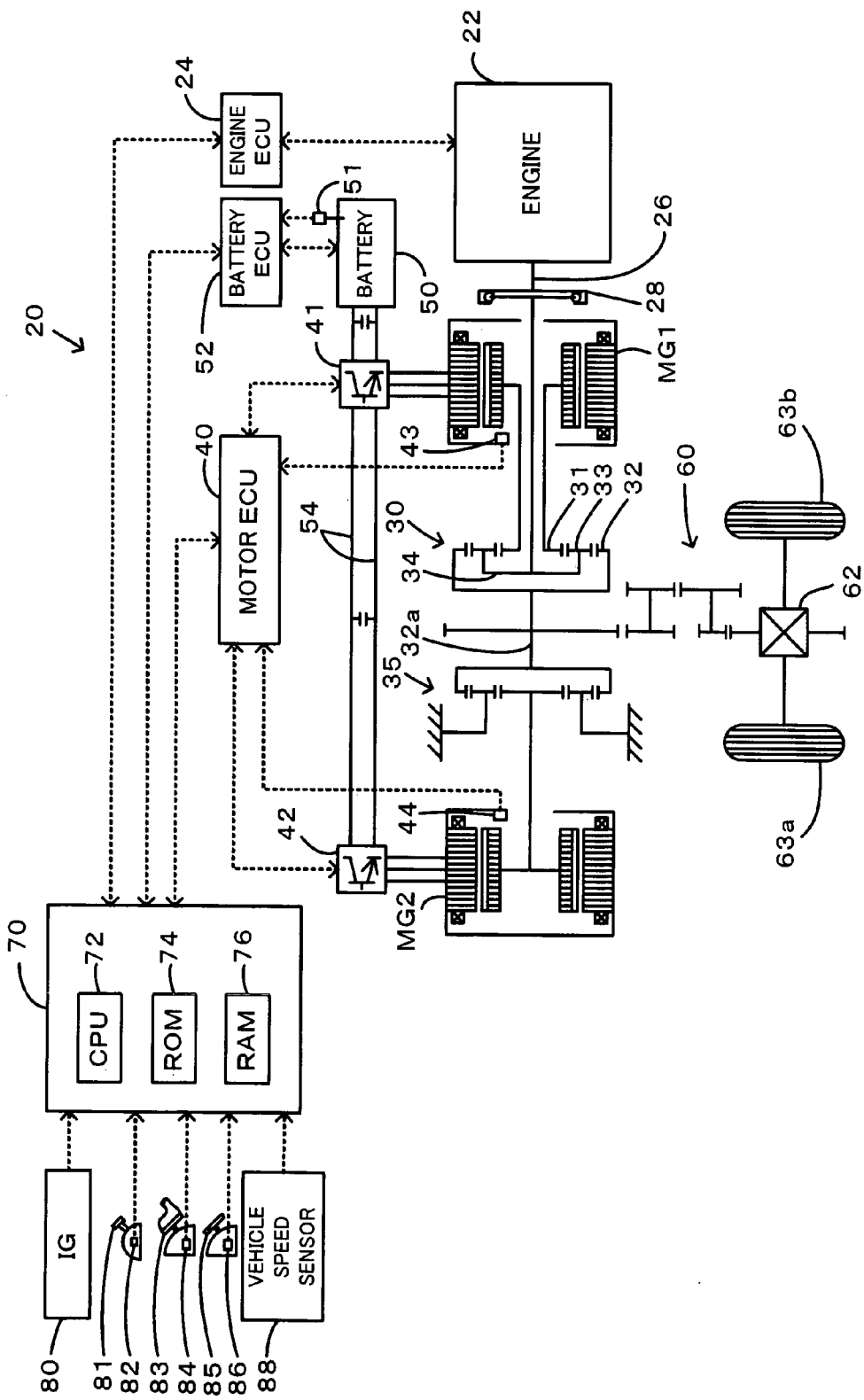
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. said motor.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
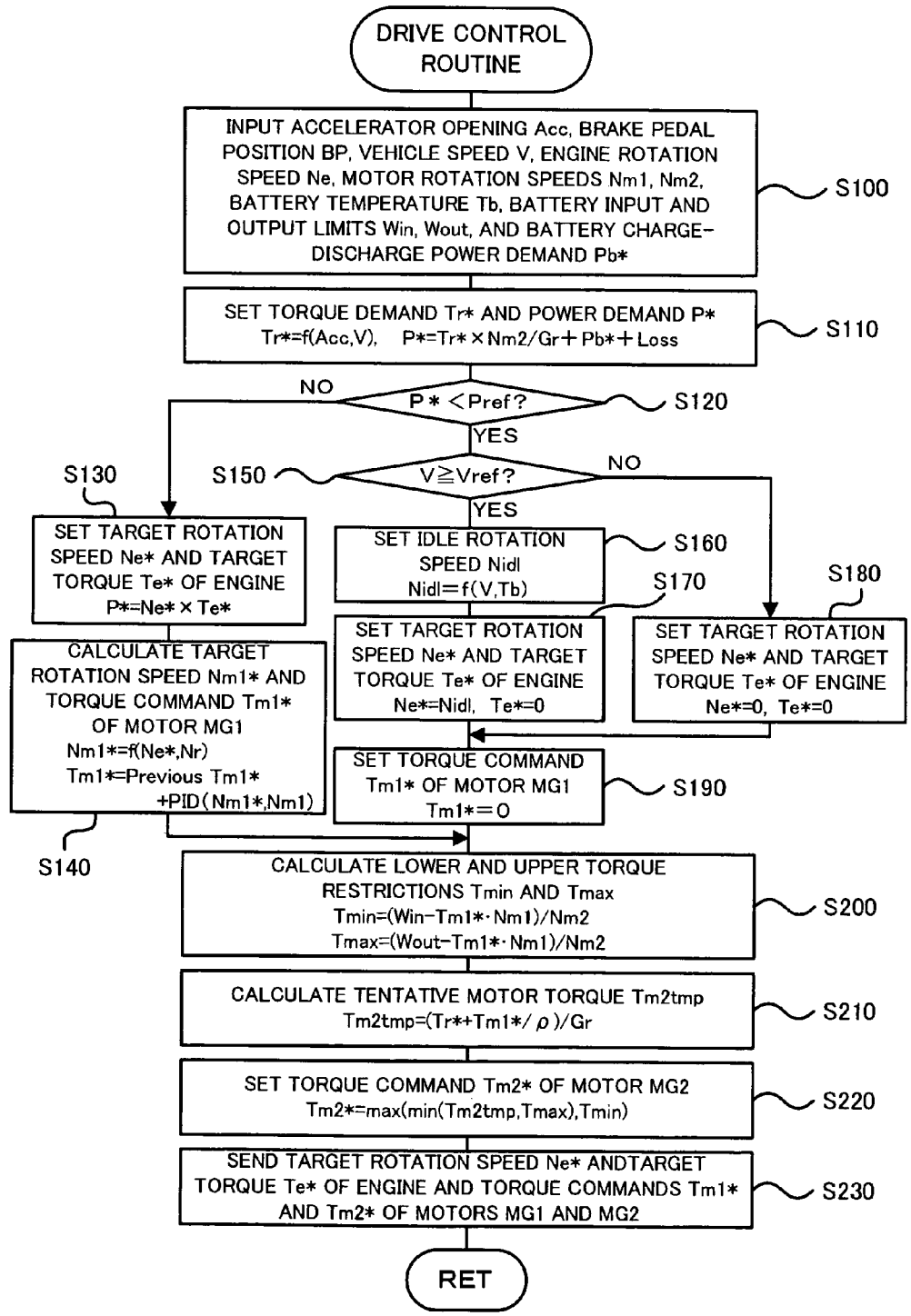
FIG. 2 is a flowchart showing a drive control routine executed by a hybrid electronic control unit included in the hybrid vehicle of the embodiment.

The description now regards the operations of the hybrid vehicle 20 of the embodiment having the configuration discussed above. FIG. 2 is a flowchart showing a drive control routine executed by the hybrid electronic control unit 70. This routine is carried out repeatedly at preset time intervals (for example, at every several msec).

Figure 3:
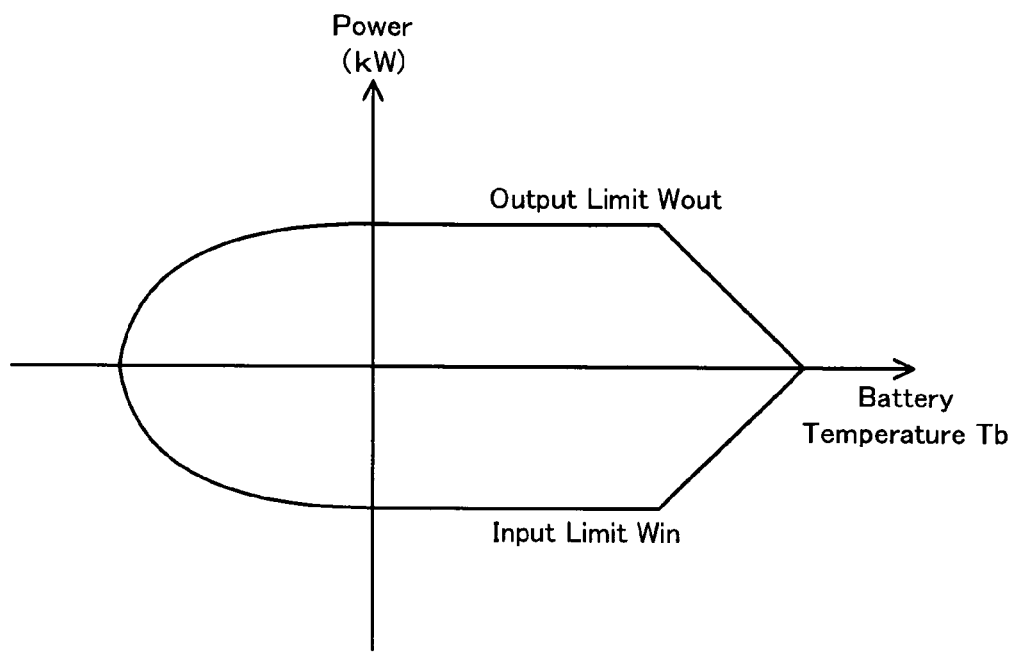
FIG. 3 shows variations in input limit Win and output limit Wout against the temperature Tb of a battery.
Figure 4:
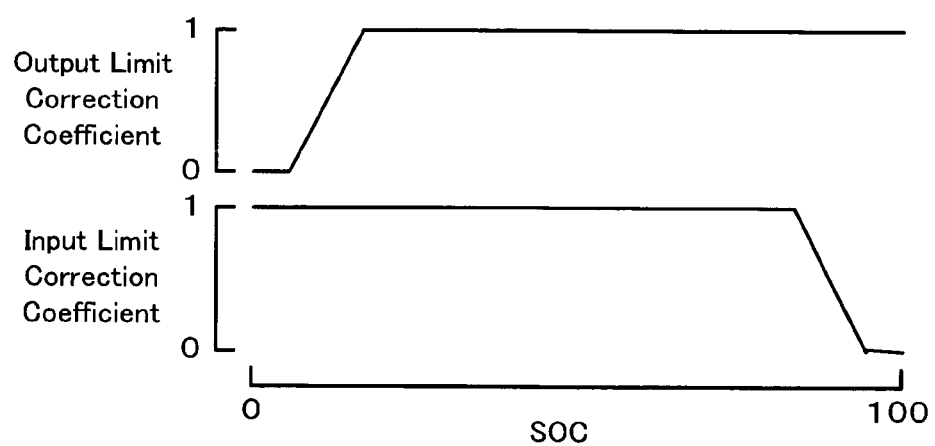
FIG. 4 shows variations in output limit correction coefficient and input limit correction coefficient against the current state of charge (SOC) of the battery.

In the drive control routine, the CPU 72 of the hybrid electronic control unit 70 first inputs various data required for control, that is, the accelerator opening Acc from the accelerator pedal position sensor 84, the brake pedal position BP from the brake pedal position sensor 86, the vehicle speed V from the vehicle speed sensor 88, rotation speeds Nm1 and Nm2 of the motors MG1 and MG2, a rotation speed Ne of the engine 22, and the temperature Tb, a charge-discharge power demand Pb*, an input limit Win, and an output limit Wout of the battery 50 (step S100). The rotation speed Ne of the engine 22 is computed from a signal representing a crank position detected by a crank position sensor (not shown) attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The temperature Tb of the battery 50 is measured by the temperature sensor 51 and is received from the battery ECU 52 by communication. The charge-discharge power demand Pb*, the input limit Win, and the output limit Wout of the battery 50 are set based on the temperature Tb of the battery 50 measured by the temperature sensor 51 and the observed current state of charge (SOC) of the battery 50 and are received from the battery ECU 52 by communication. For example, the procedure of the embodiment sets the charge-discharge power demand Pb* to make the actual state of charge (SOC) approach to a target SOC. The procedure of the embodiment specifies reference values of the input limit Win and the output limit Wout corresponding to the measured battery temperature Tb, determines an input limit correction coefficient and an output limit correction coefficient corresponding to the current state of charge (SOC) of the battery 50, and multiplies the specified reference values of the input limit Win and the output limit Wout by the corresponding correction coefficients to set the input limit Win and the output limit Wout of the battery 50. FIG. 3 shows variations in input limit Win and output limit Wout against the battery temperature Tb. FIG. 4 shows variations in output limit correction coefficient and input limit correction coefficient against the current state of charge (SOC) of the battery 50.

Figure 5:
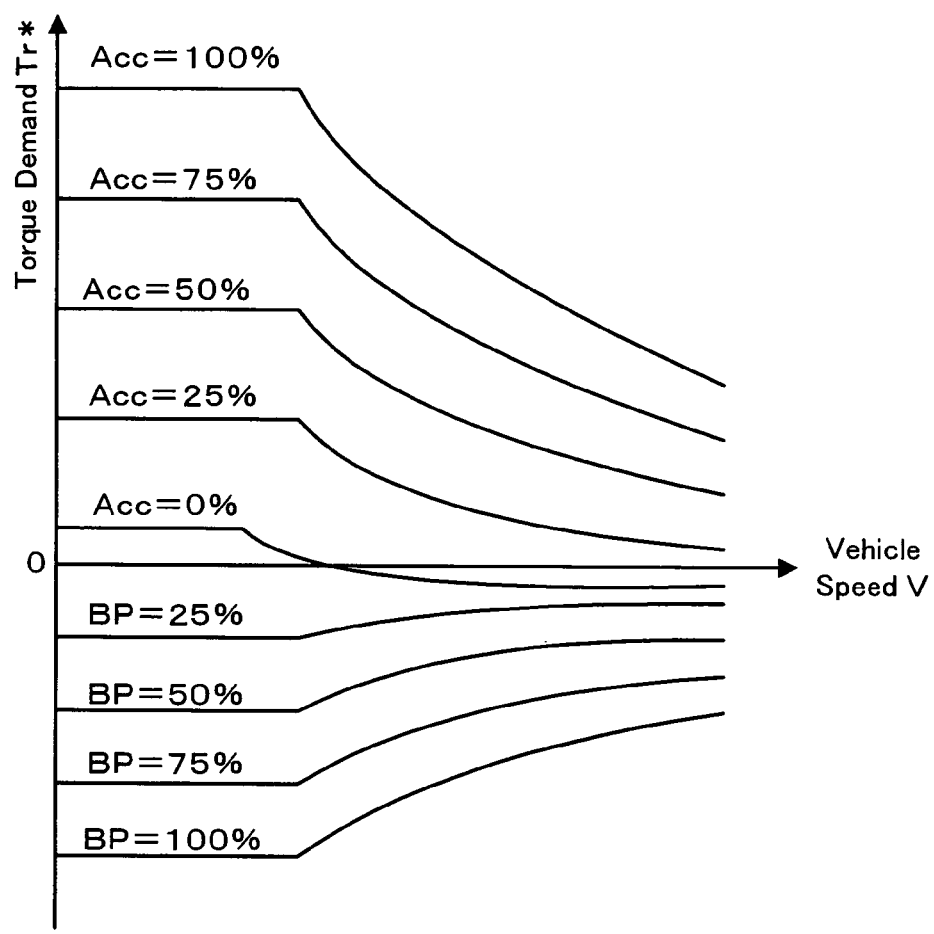
FIG. 5 shows one example of a torque demand setting map.

After the data input, the CPU 72 sets a torque demand Tr* to be output to the ring gear shaft 32a or the drive shaft linked to the drive wheels 63a and 63b as the torque required for the vehicle and a power demand P* required to drive the hybrid vehicle 20, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from the map. One example of the torque demand setting map is shown in FIG. 5. This map includes braking torque variations, although this part is not directly related to the control procedure of this embodiment. The power demand P* is calculated as the sum of the product of the torque demand Tr* and a rotation speed Nr of the ring gear shaft 32a or the drive shaft, the charge-discharge power demand Pb* of the battery 50, and a potential loss. The rotation speed Nr of the ring gear shaft 32a is obtained by multiplying the vehicle speed V by a conversion coefficient k or by dividing the rotation speed Nm2 of the motor MG2 by a gear ratio Gr of the reduction gear 35.

Figure 6:
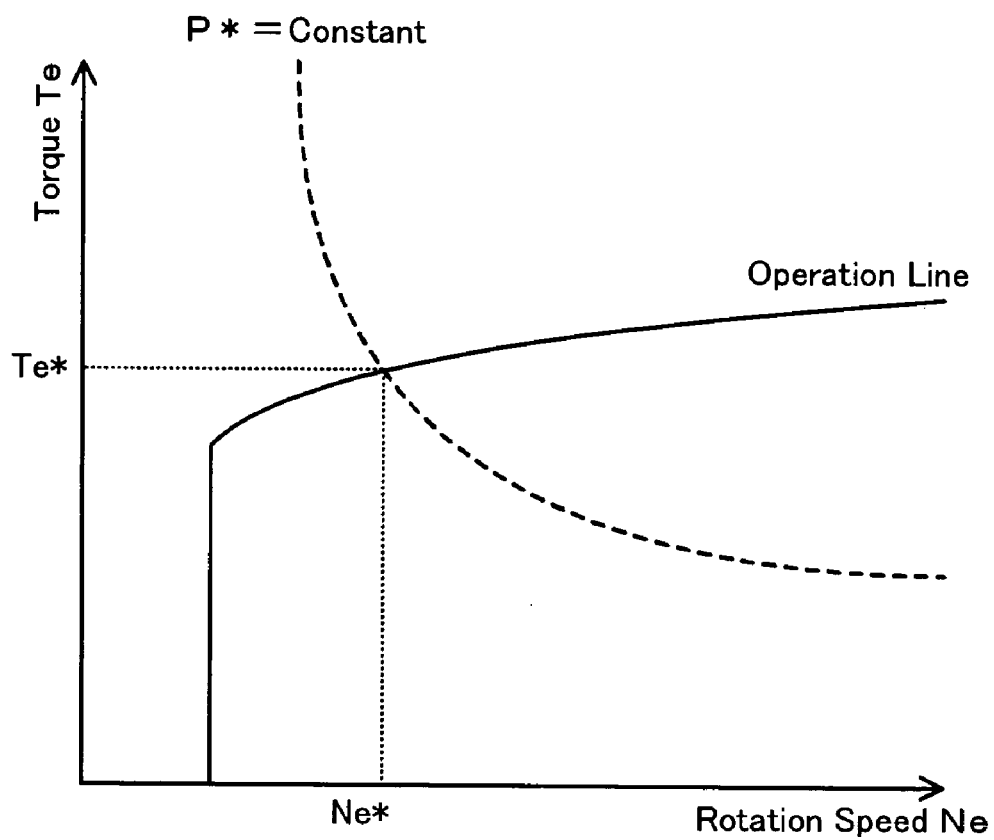
FIG. 6 shows an efficient operation line of an engine to set a target rotation speed Ne* and a target torque Te* of the engine.

After setting of the torque demand Tr* and the power demand P* at step S110, the set power demand P* is compared with a predetermined threshold value Pref (step S120). The threshold value Pref is set to or around a lower limit of efficient power output from the engine 22. When the power demand P* is not less than the predetermined threshold value Pref, the CPU 72 sets a target rotation speed Ne* and a target torque Te* of the engine 22 corresponding to the power demand P* (step S130). The target rotation speed Ne* and the target torque Te* of the engine 22 are determined according to an efficient operation line of ensuring efficient operations of the engine 22 and the power demand P*. FIG. 6 shows an efficient operation line of the engine 22 to set the target rotation speed Ne* and the target torque Te*. As clearly shown in FIG. 6, the target rotation speed Ne* and the target torque Te* are given as an intersection of the efficient operation line and a line of constant power demand P* (=Ne*×Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio p of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S140):

$$Nm1^* = Ne^* \cdot (1+\rho)/\rho - Nm2/(Gr \cdot \rho) \tag{1}$$

$$Tm1^* = \text{Previous } Tm1^* + k1(Nm1^* - Nm1) + k2\int(Nm1^* - Nm1)dt \tag{2}$$

Figure 7:
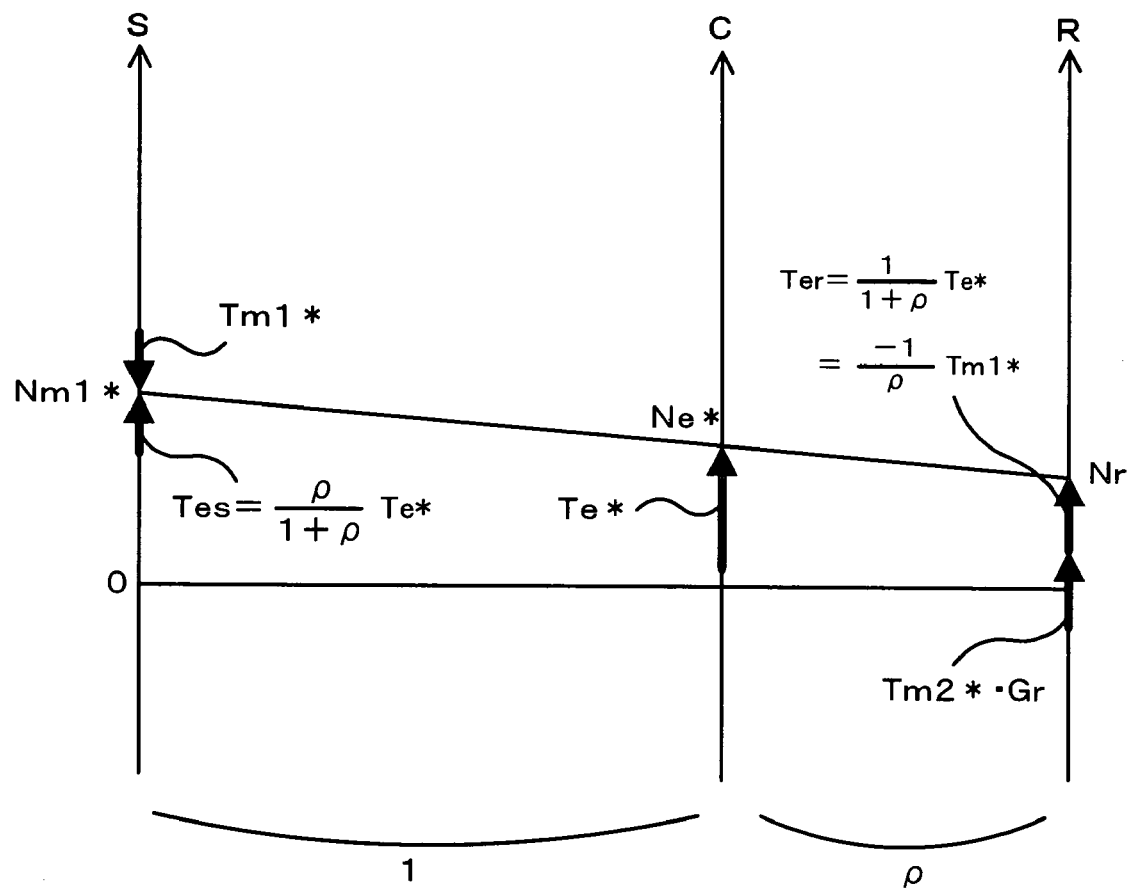
FIG. 7 is an alignment chart showing torque-rotation speed dynamics of respective rotation elements included in a power distribution integration mechanism.

Equation (1) is a dynamic relational expression of the rotation elements included in the power distribution integration mechanism 30. FIG. 7 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a), which is obtained by multiplying the rotation speed Nm2 of the motor MG2 by the gear ratio Gr of the reduction gear 35. Equation (1) is readily introduced from this alignment chart of FIG. 7. Two thick arrows on the axis 'R' respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S200):

$$Tmin = (Win - Tm1^* \cdot Nm1)/Nm2 \tag{3}$$

$$Tmax = (Wout - Tm1^* \cdot Nm1)/Nm2 \tag{4}$$

The lower torque restriction Tmin and the upper torque restriction Tmax are respectively given by dividing a difference between the input limit Win of the battery 50 and power consumption (power generation) of the motor MG1, which is the product of the torque command Tm1* and the input current rotation speed Nm1 of the motor MG1, and a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio p of the power distribution integration mechanism 30, and the gear ratio Gr of the reduction gear 35 according to Equation (5) given below (step S210):

$$Tm2tmp = (Tr^* + Tm1^*/\rho)/Gr \quad (5)$$

The CPU 72 limits the tentative motor torque Tm2tmp to the range between the calculated lower torque restriction Tmin and upper torque restriction Tmax to set a torque command Tm2* of the motor MG2 (step S220). Setting the torque command Tm2* of the motor MG2 in this manner restricts the torque demand Tr* to be output to the ring gear shaft 32a or the drive shaft within the range between the input limit Win and the output limit Wout of the battery 50. Equation (5) is readily introduced from the alignment chart of FIG. 7.

The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S230), before exiting from the drive control routine. The engine ECU 24 receives the target rotation speed Ne* and the target torque Te* and executes fuel injection control and ignition control of the engine 22 to drive the engine 22 at the specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

When the power demand P* is less than the predetermined threshold value Pref at step S120, on the other hand, the CPU 72 subsequently compares the input vehicle speed V with a preset reference vehicle speed Vref (step S150). The reference vehicle speed Vref is used as a criterion for determining whether the engine 22 is to be idled or to be stopped and is set to a relatively small value, for example, 10 km/h, 20 km/h, or 30 km/h. When the input vehicle speed V is lower than the preset reference vehicle speed Vref at step S150, the operation of the engine 22 is to be stopped. The CPU 72 accordingly sets both the target rotation speed Ne* and the target torque Te* of the engine 22 to 0 (step S180), sets the torque command Tm1* of the motor MG1 to 0 (step S190), and sets the torque command Tm2* of the motor MG2 to ensure output of the torque demand Tr* to the ring gear shaft 32a or the drive shaft within the range between the input limit Win and the output limit Wout of the battery 50 (steps S200 to S220). The CPU 72 then sends the target rotation speed Ne* and the target torque Te* of the engine 22 to the engine ECU 24, while sending the torque commands Tm1* and Tm2* of the motors MG1 and MG2 to the motor ECU 40 (step S230), before exiting from the drive control routine. The engine ECU 24 receives the target rotation speed Ne* and the target torque Te* set equal to 0 and stops the operation of the engine 22.

Figure 8:
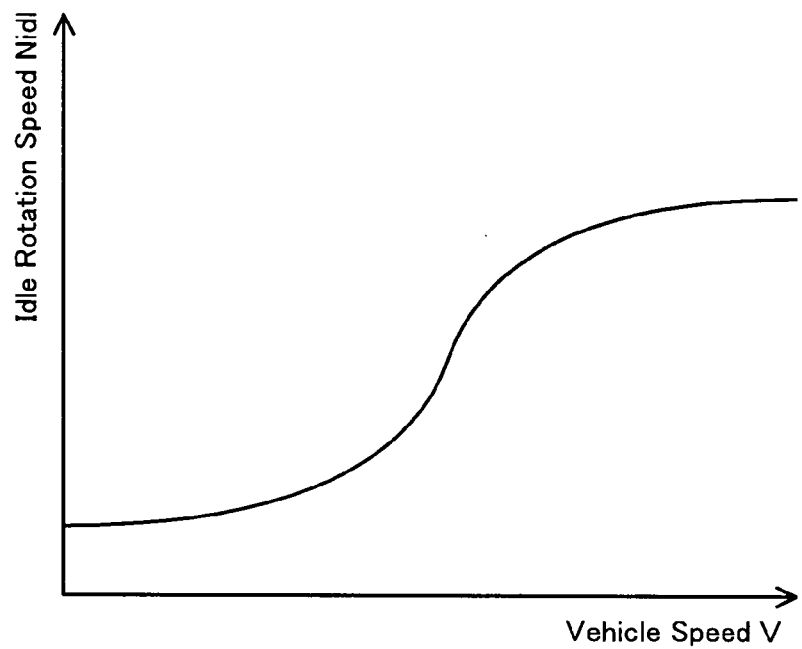
FIG. 8 shows a variation in idle rotation speed Nid1 against the vehicle speed V.
Figure 9:
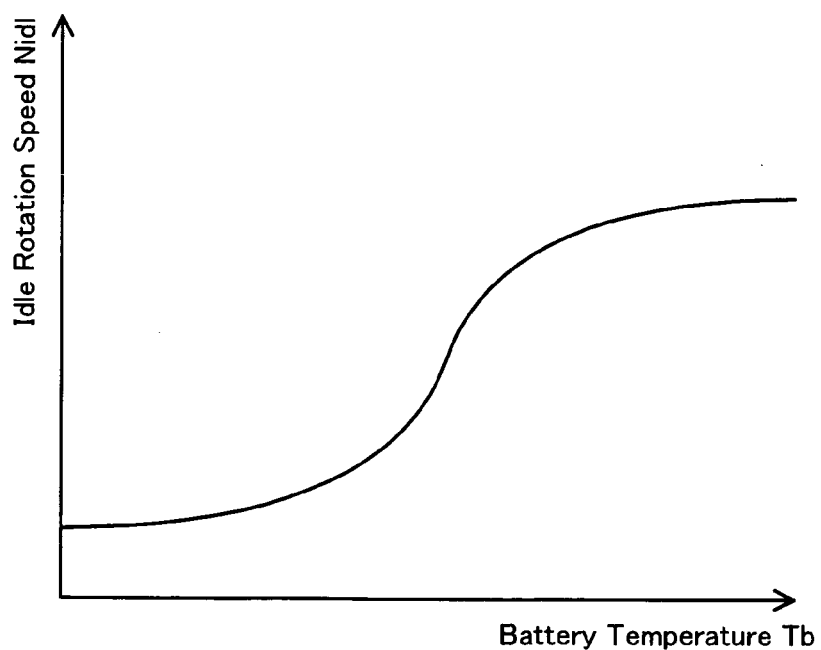
FIG. 9 shows a variation in idle rotation speed Nid1 against the battery temperature Tb.

When the input vehicle speed V is not lower than the preset reference vehicle speed Vref at step S150, on the other hand, the CPU 72 sets an idle rotation speed Nid1 corresponding to the vehicle speed V and the battery temperature Tb (step S160). FIG. 8 shows a variation in idle rotation speed Nid1 against the vehicle speed V, and FIG. 9 shows a variation in idle rotation speed Nid1 against the battery temperature Tb. As shown in these maps, the idle rotation speed Nid1 is set to increase with an increase in vehicle speed V and with an increase in battery temperature Tb.

These settings enable the output power level of the engine 22 to be promptly changed in response to an abrupt variation in torque demand Tr*, which is caused by the driver's abrupt depression or abrupt release of the accelerator pedal 83, and thereby reduce a charge-discharge load of the battery 50. A change of the power demand P* accompanied with a variation in torque demand Tr* is covered by a change of the output power level from the engine 22 and a change of charge-discharge power of the battery 50. The engine 22 has a relatively poor response to change its output power level and can not promptly follow an abrupt variation in torque demand Tr*, which is caused by the driver's abrupt depression or abrupt release of the accelerator pedal 83. The level of the charge-discharge power of the battery 50 is accordingly increased to ensure output of a required power to the ring gear shaft 32a or the drive shaft corresponding to the torque demand Tr*. Frequent charges and discharges of the battery 50 even within the allowable range between the input limit Win and the output limit Wout may lead to premature deterioration of the battery 50. Deterioration of the battery 50 is accelerated with an increase in magnitude of the charge-discharge power and with an increase in frequency of charges and discharges. In order to prevent such premature deterioration of the battery 50, the abrupt change of the power demand P* accompanied with the abrupt variation in torque demand Tr* is to be covered by the change of the output power level from the engine 22 to the maximum possible extent. The power demand P* is basically given as the product of the torque demand Tr* and the rotation speed Nr of the ring gear shaft 32a (Nr=vehicle speed V× conversion coefficient k). The change of the power demand P* accompanied with the abrupt variation in torque demand Tr* is thus increased with an increase in vehicle speed V. The output power from the engine 22 is given as the product of the rotation speed Ne and the torque Te. The output power level of the engine 22 is accordingly changeable by varying either or both of the engine rotation speed Ne and the engine torque Te. The time required for varying the engine torque Te is substantially equivalent to the time required for varying the air intake flow and the amount of fuel injection and is relatively shorter than the time required for varying the engine rotation speed Ne. The required change of the output power level of the engine 22 in response to the change of the power demand P* accompanied with the abrupt variation in torque demand Tr* is thus attained more quickly by varying the engine torque Te than by varying the engine rotation speed Ne. As mentioned above, the change level of the power demand P* accompanied with the abrupt variation in torque demand Tr* is increased with an increase in vehicle speed V. The higher rotation speed Ne of the engine 22 is thus desirable to promptly cover the change of the power demand P*. This is why the idle rotation speed Nid1 is increased with an increase in vehicle speed V. The engine 22 is driven at the idle rotation speed Nid1, which is set to increase with the higher vehicle speed V. This desirably prevents the battery 50 from discharging a relatively large electric power in response to the driver's abrupt depression of the accelerator pedal 83. The battery 50 is often expected to have a higher internal resistance at the higher battery temperature Tb. The large charge-discharge power of the battery 50 under such conditions accelerates deterioration of the battery 50. It is thus required to increase the idle rotation speed Nid1 and enhance the response of the engine 22 with an increase in temperature Tb of the battery 50. This is why the idle rotation speed Nid1 is increased with an increase in battery temperature Tb. The procedure of this embodiment stores variations in idle rotation speed Nid1 against the vehicle speed V and the battery temperature Tb as an idle rotation speed setting map in the ROM 74 and reads the idle rotation speed Nid1 corresponding to the given vehicle speed V and the given battery temperature Tb from the map.

After setting the idle rotation speed Nid1, the CPU 72 sets the target rotation speed Ne* and the target torque Te* of the engine 22 respectively to the idle rotation speed Nid1 and to 0, in order to idle the engine 22 at the idle rotation speed Nid1 (step S170). The CPU 72 subsequently sets the torque command Tm1* of the motor MG1 to 0 (step S190), and sets the torque command Tm2* of the motor MG2 to ensure output of the torque demand Tr* to the ring gear shaft 32a or the drive shaft within the range between the input limit Win and the output limit Wout of the battery 50 (steps S200 to S220). The CPU 72 then sends the target rotation speed Ne* and the target torque Te* of the engine 22 to the engine ECU 24, while sending the torque commands Tm1* and Tm2* of the motors MG1 and MG2 to the motor ECU 40 (step S230), before exiting from the drive control routine. The engine ECU 24 receives the target rotation speed Ne* set to the idle rotation speed Nid1 and the target torque Te* set to 0 and idles the engine 22 at the idle rotation speed Nid1.

Figure 10:
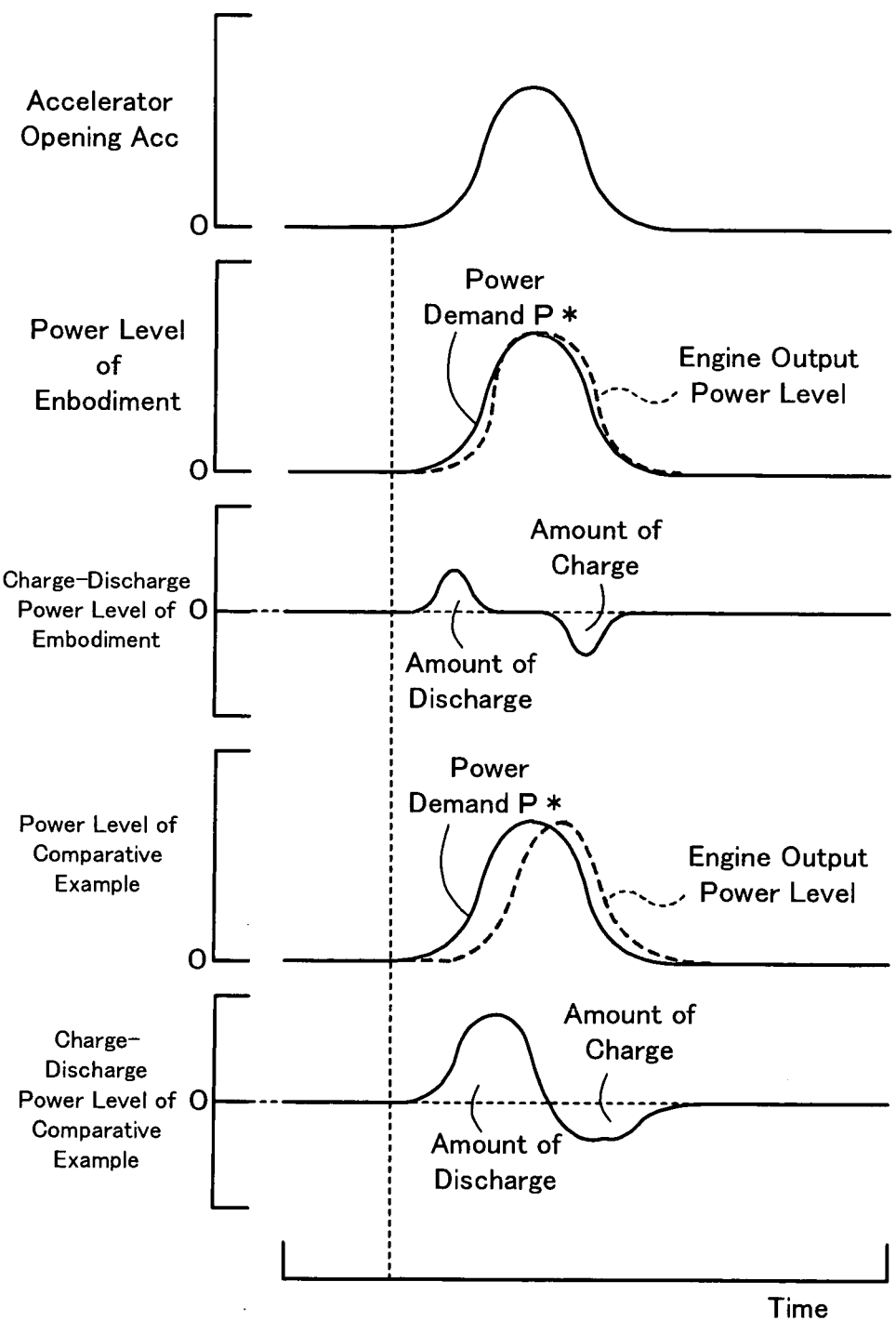
FIG. 10 shows time variations of a power demand P*, an output power level of the engine, and a charge-discharge power level of the battery in response to a variation in accelerator opening Acc.

FIG. 10 shows time variations of the power demand P*, the output power level of the engine 22, and the charge-discharge power level of the battery 50 in response to the driver's abrupt depression and subsequent abrupt release of the accelerator pedal 83, while the engine 22 is idled at the idle rotation speed Nid1 corresponding to the vehicle speed V and the battery temperature Tb. Curves of a comparative examples in FIG. 10 represent time variations of the power demand P*, the output power level of the engine 22, and the charge-discharge power level of the battery 50 in response to the driver's abrupt depression and subsequent abrupt release of the accelerator pedal 83, while the engine 22 is idled at a fixed idle rotation speed of 600 rpm. As clearly shown in this graph, the drive control of this embodiment enables the engine 22 to have a high following capability and promptly cover the change of the power demand P*, thus desirably reducing both the charge-discharge power and the amounts of charge and discharge of the battery 50. The drive control of the comparative example, on the other hand, causes the engine 22 to have a poor following capability of covering the change of the power demand P*, thus undesirably increasing both the charge-discharge power and the amounts of charge and discharge of the battery 50.

In the hybrid vehicle 20 of the embodiment described above, the idle rotation speed Nid1 of the engine 22 is set to increase with an increase in vehicle speed V and with an increase in battery temperature Tb. The engine 22 is idled at the idle rotation speed Nid1 set in this manner. This arrangement enables the engine 22 to have a high following capability and promptly change its output power level in response to a change of the power demand P* accompanied with an abrupt variation in torque demand Tr*. The prompt follow-up of the engine 22 desirably reduces the required level of charging or discharging of the battery 50, which is triggered by a response delay of the engine 22. Namely the drive control of this embodiment reduces both the charge-discharge power and the amounts of charge and discharge of the battery 50, thus effectively preventing premature deterioration of the battery 50.

The hybrid vehicle 20 of the embodiment sets the idle rotation speed Nid1 of the engine 22 to increase with an increase in vehicle speed V and with an increase in battery temperature Tb. One possible modification may set the idle rotation speed Nid1 to increase with only an increase in vehicle speed V, regardless of the battery temperature Tb.

Figure 11:
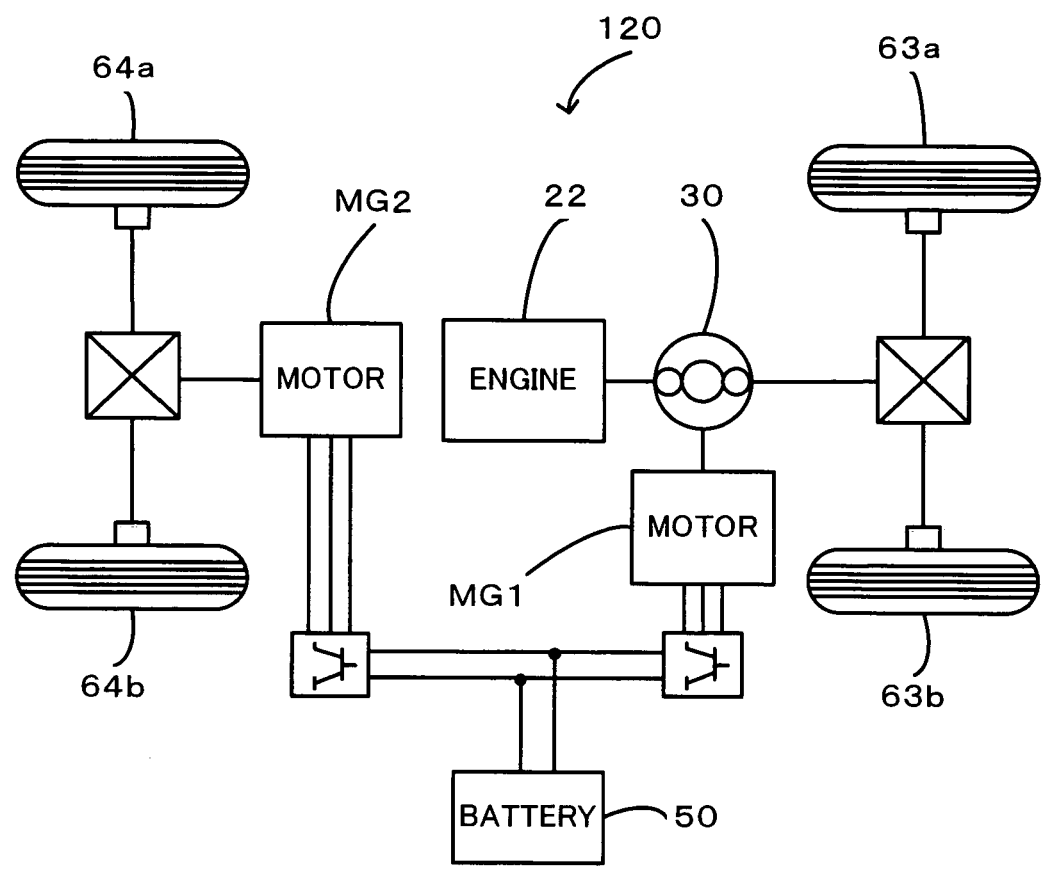
FIG. 11 schematically illustrates the configuration of another hybrid vehicle in one modified example of the invention.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 11, the power of the motor MG2 may be output to another axle (that is, an axle linked with wheels 64a and 64b), which is different from an axle connected with the ring gear shaft 32a (that is, an axle linked with the wheels 63a and 63b).

Figure 12:
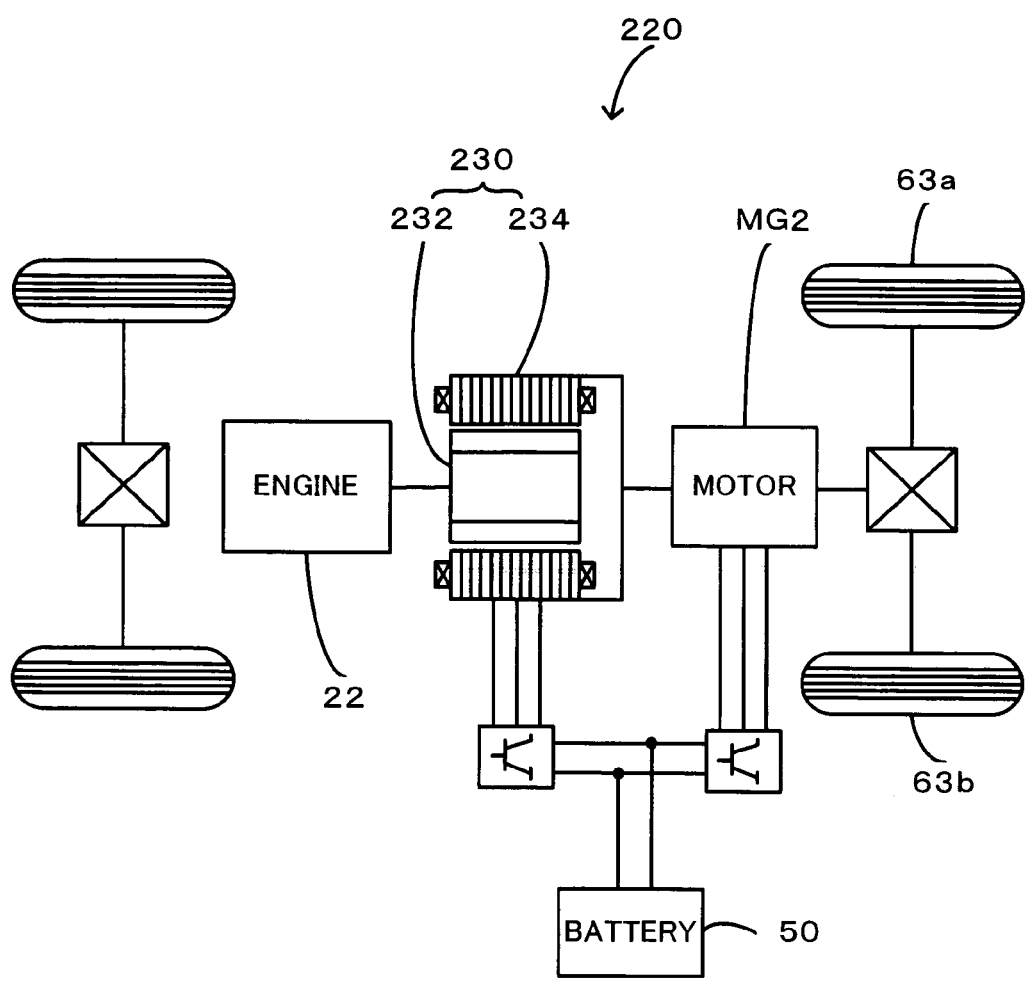
FIG. 12 schematically illustrates the configuration of still another hybrid vehicle in another modified example of the invention.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 12, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The above embodiment regards the hybrid vehicle 20 equipped with the engine 22, the motors MG1 and MG2, the power distribution integration mechanism 30, and the battery 50. The technique of the invention is also applicable to a power output apparatus that is equipped with the engine 22, the motors MG1 and MG2, the power distribution integration mechanism 30, and the battery 50 and outputs power to the ring gear shaft 32a or the drive shaft. In the application to this power output apparatus, the vehicle speed V in the drive control flow is replaced by the rotation speed of the ring gear shaft 32a or the drive shaft. The idle rotation speed Nid1 of the engine 22 is set to increase with an increase in rotation speed Nr of the ring gear shaft 32a and with an increase in battery temperature Tb. The engine 22 is idled at the idle rotation speed Nid1 set in this manner. The power output apparatus may be mounted on any of various motor vehicles and other vehicles including train cars, as well as on diversity of other moving bodies including boats, ships, and aircraft. The power output apparatus may otherwise be incorporated as the power source in construction equipment.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No.2004-164908 filed Jun. 2, 2004 including specification, drawings and claims is incorporated herein by reference in its entirety.

What is claimed is:

1. A power output apparatus that outputs power to a drive shaft, said power output apparatus comprising:
   an internal combustion engine;
   a power conversion mechanism that converts at least part of output power of the internal combustion engine into electric power;
   a motor that consumes the electric power converted by the power conversion mechanism to output power to the drive shaft;
   an accumulator unit that transmits electric power to and from the power conversion mechanism and the motor;
   a rotation speed measurement unit that measures a rotation speed of the drive shaft; and a control unit including : a target idle rotation speed setting module that sets a target idle rotation speed of the internal combustion engine corresponding to the measured rotation speed of the drive shaft; a power demand specification module that specifies a power demand required for the drive shaft; a target power setting module that sets a target power to be output from the internal combustion engine corresponding to the specified power demand; and a control module that, when the target power requires idling of the internal combustion engine, controls the internal combustion engine, the power conversion mechanism, and the motor to idle the internal combustion engine at the target idle rotation speed and to ensure output of a required power corresponding to the specified power demand to the drive shaft, when the target power does not require idling of the internal combustion engine, said control module controlling the internal combustion engine, the power conversion mechanism, and the motor to ensure output of the target power from the internal combustion engine and to ensure output of a required power corresponding to the specified power demand to the drive shaft.

2. A power output apparatus in accordance with claim 1, wherein said target idle rotation speed setting module sets the target idle rotation speed to increase with an increase in measured rotation speed of the drive shaft.

3. A power output apparatus in accordance with claim 1, said power output apparatus further comprising:
a temperature measurement unit that measures temperature of the accumulator unit,
wherein said target idle rotation speed setting module sets the target idle rotation speed according to the measured temperature of the accumulator unit.

4. A power output apparatus in accordance with claim 3, wherein said target idle rotation speed setting module sets the target idle rotation speed to increase with an increase in measured temperature of the accumulator unit.

5. A power output apparatus in accordance with claim 1, wherein the power conversion mechanism is connected to an output shaft of the internal combustion engine and to the drive shaft and outputs at least part of the output power of the internal combustion engine to the drive shaft through input and output of electric power and mechanical power.

6. A power output apparatus in accordance with claim 5, wherein the power conversion mechanism comprises:
a three shaft-type power input output module that is linked to three shafts, that is, the output shaft of the internal combustion engine, the drive shaft, and a rotating shaft, and automatically determines power input from and output to a residual one shaft based on powers input from and output to any two shafts among the three shafts; and
a generator that inputs and outputs power from and to the rotating shaft.

7. A power output apparatus in accordance with claim 5, wherein the power conversion mechanism comprises a pair-rotor motor that has a first rotor linked to the output shaft of the internal combustion engine and a second rotor linked to the drive shaft and is driven by relative rotation of the first rotor to the second rotor.

8. A hybrid vehicle comprising:
an internal combustion engine;
a power conversion mechanism that converts at least part of output power of the internal combustion engine into electric power;
a motor that consumes the electric power converted by the power conversion mechanism to output power to a drive shaft linked to an axle;
an accumulator unit that transmits electric power to and from the power conversion mechanism and the motor;
a vehicle speed measurement unit that measures a vehicle speed; and
a control unit including : a target idle rotation speed setting module that sets a target idle rotation speed of the internal combustion engine corresponding to the measured vehicle speed; a power demand specification module that specifies a power demand required for the drive shaft; a target power setting module that sets a target power to be output from the internal combustion engine corresponding to the specified power demand; and a control module that, when the target power requires idling of the internal combustion engine, controls the internal combustion engine, the power conversion mechanism, and the motor to idle the internal combustion engine at the target idle rotation speed and to ensure output of a required power corresponding to the specified power demand to the drive shaft, when the target power does not require idling of the internal combustion engine, said control module controlling the internal combustion engine, the power conversion mechanism, and the motor to ensure output of the target power from the internal combustion engine and to ensure output of a required power corresponding to the specified power demand to the drive shaft.

9. A hybrid vehicle in accordance with claim 8, wherein said target idle rotation speed setting module sets the target idle rotation speed to increase with an increase in measured vehicle speed.

10. A hybrid vehicle in accordance with claim 8, said hybrid vehicle further comprising:
a temperature measurement unit that measures temperature of the accumulator unit,
wherein said target idle rotation speed setting module sets the target idle rotation speed according to the measured temperature of the accumulator unit.

11. A hybrid vehicle in accordance with claim 10, wherein said target idle rotation speed setting module sets the target idle rotation speed to increase with an increase in measured temperature of the accumulator unit.

12. A hybrid vehicle in accordance with claim 8, wherein the power conversion mechanism is connected to an output shaft of the internal combustion engine and to the drive shaft and outputs at least part of the output power of the internal combustion engine to the drive shaft through input and output of electric power and mechanical power.

13. A hybrid vehicle in accordance with claim 12, wherein the power conversion mechanism comprises:
a three shaft-type power input output module that is linked to three shafts, that is, the output shaft of the internal combustion engine, the drive shaft, and a rotating shaft, and automatically determines power input from and output to a residual one shaft based on powers input from and output to any two shafts among the three shafts; and
a generator that inputs and outputs power from and to the rotating shaft.

14. A hybrid vehicle in accordance with claim 12, wherein the power conversion mechanism comprises a pair-rotor motor that has a first rotor linked to the output shaft of the internal combustion engine and a second rotor linked to the drive shaft and is driven by relative rotation of the first rotor to the second rotor.

15. A control method of a power output apparatus, which includes an internal combustion engine, a power conversion mechanism that converts at least part of output power of the internal combustion engine into electric power, a motor that consumes the electric power converted by the power conversion mechanism to output power to a drive shaft, and an accumulator unit that transmits electric power to and from the power conversion mechanism and the motor, said control method comprising the steps of:

setting a target power to be output from the internal combustion engine corresponding to a specified power demand required for the drive shaft; and when the target power requires idling of the internal combustion engine, setting a target idle rotation speed of the internal combustion engine corresponding to a measured rotation speed of the drive shaft and controlling the internal combustion engine, the power conversion mechanism, and the motor to idle the internal combustion engine at the target idle rotation speed and to ensure output of a required power corresponding to the specified power demand to the drive shaft, when the target power does not require idling of the internal combustion engine, controlling the internal combustion engine, the power conversion mechanism, and the motor to ensure output of the target power from the internal combustion engine and to ensure output of a required power corresponding to the specified power demand to the drive shaft.

16. A control method of a hybrid vehicle, which includes an internal combustion engine, a power conversion mechanism that converts at least part of output power of the internal combustion engine into electric power, a motor that consumes the electric power converted by the power conversion mechanism to output power to a drive shaft, and an accumulator unit that transmits electric power to and from the power conversion mechanism and the motor, said control method comprising the steps of:

setting a target power to be output from the internal combustion engine corresponding to a specified power demand required for an axle; and when the target power requires idling of the internal combustion engine, setting a target idle rotation speed of the internal combustion engine corresponding to a measured vehicle speed and controlling the internal combustion engine, the power conversion mechanism, and the motor to idle the internal combustion engine at the target idle rotation speed and to ensure output of a required power corresponding to the specified power demand to the axle, when the target power does not require idling of the internal combustion engine, controlling the internal combustion engine, the power conversion mechanism, and the motor to ensure output of the target power from the internal combustion engine and to ensure output of a required power corresponding to the specified power demand to the axle.

* * * * *

UNITED STATES PATENT AND TRADEMARK OFFICE
CERTIFICATE OF CORRECTION

PATENT NO. : 7,255,662 B2  Page 1 of 1
APPLICATION NO. : 11/140973
DATED : August 14, 2007
INVENTOR(S) : Yoshihiko Hiroe et al.

It is certified that error appears in the above-identified patent and that said Letters Patent is hereby corrected as shown below:

Column  Line
8           15     Change "previously. said motor." to --previously--
10          10     Change "gear ratio P" to --gear ratio ρ--
                   Change "gear ratio P" to --gear ratio ρ--

Signed and Sealed this

Twentieth Day of May, 2008

JON W. DUDAS
*Director of the United States Patent and Trademark Office*